(12) United States Patent
Malson et al.

(10) Patent No.: US 10,507,856 B1
(45) Date of Patent: Dec. 17, 2019

(54) TRANSPORT CART WITH RECLINING CHAIRS

(71) Applicants: Simon Malson, Dupont, WA (US); Tom Malson, Summerville, SC (US)

(72) Inventors: Simon Malson, Dupont, WA (US); Tom Malson, Summerville, SC (US)

( * ) Notice: Subject to any disclaimer, the term of this patent is extended or adjusted under 35 U.S.C. 154(b) by 0 days.

(21) Appl. No.: 15/836,762

(22) Filed: Dec. 8, 2017

(51) Int. Cl.
| | |
|---|---|
| *B62B 1/20* | (2006.01) |
| *A47C 1/022* | (2006.01) |
| *A47C 13/00* | (2006.01) |
| *A47C 7/70* | (2006.01) |
| *A47C 4/20* | (2006.01) |
| *A47C 9/10* | (2006.01) |
| *A47C 1/14* | (2006.01) |

(52) U.S. Cl.
CPC .............. *B62B 1/208* (2013.01); *A47C 1/022* (2013.01); *A47C 4/20* (2013.01); *A47C 7/70* (2013.01); *A47C 13/00* (2013.01); *A47C 1/14* (2013.01); *A47C 9/10* (2013.01); *B62B 2202/031* (2013.01); *B62B 2202/32* (2013.01); *B62B 2202/52* (2013.01)

(58) Field of Classification Search
CPC .. A47C 7/62; A47C 4/286; A47C 1/14; A47C 4/283; A47C 1/146
See application file for complete search history.

(56) References Cited

U.S. PATENT DOCUMENTS

| | | |
|---|---|---|
| 202,560 A | 4/1878 | Longking |
| 2,065,233 A | 12/1936 | Mallett |
| 2,150,478 A | 3/1939 | Yerrick |
| 2,546,493 A | 3/1951 | Booth |
| 3,693,993 A | 9/1972 | Mazzarelli et al. |
| 3,947,903 A | 4/1976 | Menke |
| 4,114,914 A | 9/1978 | Cohen |
| 4,362,308 A | 12/1982 | Hicks et al. |
| 4,533,151 A | 8/1985 | Maitland |
| 4,588,197 A | 5/1986 | Benedetto, Jr. |
| 4,645,262 A | 2/1987 | Furubotten |
| 4,659,142 A | 4/1987 | Kuchinsky, Jr. |
| 5,056,804 A | 10/1991 | Wilson et al. |
| 6,079,777 A | 6/2000 | Simmons et al. |
| 6,264,216 B1 | 7/2001 | Wilson |
| 6,354,611 B1 | 3/2002 | Mihalic et al. |
| 6,988,737 B1 | 1/2006 | Clark |
| 7,703,795 B2 | 4/2010 | Williamson |
| 7,963,530 B1 | 6/2011 | Garcia |
| 7,980,616 B2 * | 7/2011 | Fletcher ................... B60N 2/01 296/64 |
| 8,297,642 B2 | 10/2012 | Tyson, III |

(Continued)

*Primary Examiner* — John D Walters
*Assistant Examiner* — James J Triggs
(74) *Attorney, Agent, or Firm* — Peter Loffler

(57) ABSTRACT

A beach cart is formed from a frame that has a pair of wheel trucks depend downwardly from either end thereof. A handle is attached at one end of the frame, either to the frame or to the wheel truck thereat, to pull the cart. A pair of chairs is attached to the frame and each has a base, a back, and a leg rest with the back capable of reclining and the leg rest capable of rotating with respect to the base. A table is located on either end of the frame and each rotates between an upright folded position and a deployed horizontal position. The chair back and leg rest as well as the tables act as sidewall when items are being transported by the cart between two locations.

23 Claims, 8 Drawing Sheets

(56) References Cited

U.S. PATENT DOCUMENTS

| | | | |
|---|---|---|---|
| 8,366,124 B1 | 2/2013 | Caldwell | |
| 8,851,503 B2 | 10/2014 | Tyson, III | |
| 9,089,459 B2 * | 7/2015 | Dindas | A61G 7/012 |
| 9,107,787 B2 * | 8/2015 | Wechter | A47K 3/122 |
| 9,173,492 B1 * | 11/2015 | Fortin | A47C 1/14 |
| 9,295,335 B2 | 3/2016 | Cardona | |
| 9,527,519 B1 * | 12/2016 | Shokouhi | B62B 3/10 |
| 2001/0005070 A1 * | 6/2001 | Kemnitzer | B62B 3/108 |
| | | | 280/33.991 |
| 2004/0183265 A1 | 9/2004 | Vecchio | |
| 2006/0071513 A1 | 4/2006 | Pedemonte | |
| 2006/0279052 A1 * | 12/2006 | Marmah | A47C 1/14 |
| | | | 280/47.26 |
| 2008/0284119 A1 | 11/2008 | Williamson | |

* cited by examiner

TRANSPORT CART WITH RECLINING CHAIRS

BACKGROUND OF THE INVENTION

1. Field of the Invention

The present invention relates to a transport cart, typically referred to as a beach cart or beach wagon, the cart having one or more chairs fixedly attached to the cart, each chair being capable of reclining and each also having adjustable foot rests. Each chair has a foldable table associated therewith.

2. Background of the Prior Art

Beach carts are a great tool to transport items to and from the beach or other desired location. Beach carts, which come in a variety of styles and designs, are typically a rectangular type cart member that has a body with sidewalls, wheels and a handle to pull the cart along via its wheels. A person loads the cart up with various items needed at the beach or other type of outing, such iteming can include a cooler, towels, sun screen, food and beverages, chairs, an umbrella, etc., and once the cart is loaded, the cart is pulled along by the handle and brought to a desired location, the wheels being of a suitable design to operate on the expected terrain. Once the day is complete, the cart is loaded back up and pulled back to the origination point, which might be a condominium or cottage or a vehicle, etc.

A typical beach cart can carry a substantial load saving a user from having to carry a heavy or bulky load or from having to make multiple trips between the origination point and the desired enjoyment location. While a great help, the typical beach cart is a static tool in that once the user arrives at the location whereat he or she intends on enjoying the day, the beach cart, once unloaded, simply sits in place awaiting to be reloaded and pulled back to the origination point. During much of the day, the beach cart has little to no utility to the user.

What is needed is a beach cart that has utility to a user throughout the day, not just as a load transport system between two locations. Such a beach cart must still perform is load transport function with relative ease and efficiency, yet also offer the user substantial functionality through the rest and relaxation day.

SUMMARY OF THE INVENTION

The transport cart with reclining chairs of the present invention addresses the aforementioned needs in the art by providing a wheel based cart that can transport a sizable load while being pulled along a terrain, yet also has substantial utility during throughout the day by acting as a platform from whereat a user enjoys the day. The transport cart with reclining chairs is easy to use, both in the traditional loading and unloading of the cart as well as its functional platform performance. The transport cart with reclining chairs is of relatively simple design and construction, being produced using standard manufacturing techniques, so as to make the device relatively inexpensive so as to be economically attractive to potential consumers of this type of device.

The transport cart with reclining chairs of the present invention is comprised of a frame that has a first side and an opposing second side joined by a first end and an opposing second end. A first wheel set extends downwardly from a lower surface of the frame and is located proximate the first end while a second wheel set extends downwardly from the lower surface of the frame and is located proximate the second end. A handle is attached to either the first wheel set or to the frame. A first is chair IS attached the frame and extends upwardly from an upper surface of the frame and is located proximate the first end while a second chair is attached the frame and extends upwardly from the upper surface of the frame and is located proximate the second end. A first table is attached to the frame and is located proximate the first end while a second table is attached to the frame is located proximate the second end. The first chair has a first base that extends between the first side and the second side and also has a first chair back that is attached to the first base proximate the second side of the frame. The first chair back articulates between a first upright position and a first reclined position. The second chair has a second base that extends between the first side and the second side and also has a second chair back that is attached to the second base proximate the second side of the frame. The second chair back articulates between a second upright position and a second reclined position. The first chair has a first leg rest that extends from the first base proximate the first side of the frame while the second chair has a second leg rest that extends from the second base proximate the first side of the frame. The first leg rest and the second leg rest are each rotatably attached to the frame. The first table articulates between a first horizontal position parallel with the frame and a first vertical position such that when the first table is in the first horizontal position, the first table attaches to the handle. The second table articulates between a second horizontal position parallel with the frame and a second vertical position. A first holder has an first open top and is attached to the first side of the frame proximate the first chair while a second holder has a second open top and is attached to the first side of the frame proximate the second chair. A third holder has a third open top and is attached to the second side of the frame between the first chair and the second chair.

BRIEF DESCRIPTION OF THE DRAWINGS

Similar reference numerals refer to similar parts throughout the several views of the drawings.

DESCRIPTION OF THE PREFERRED EMBODIMENT

Figure 1:
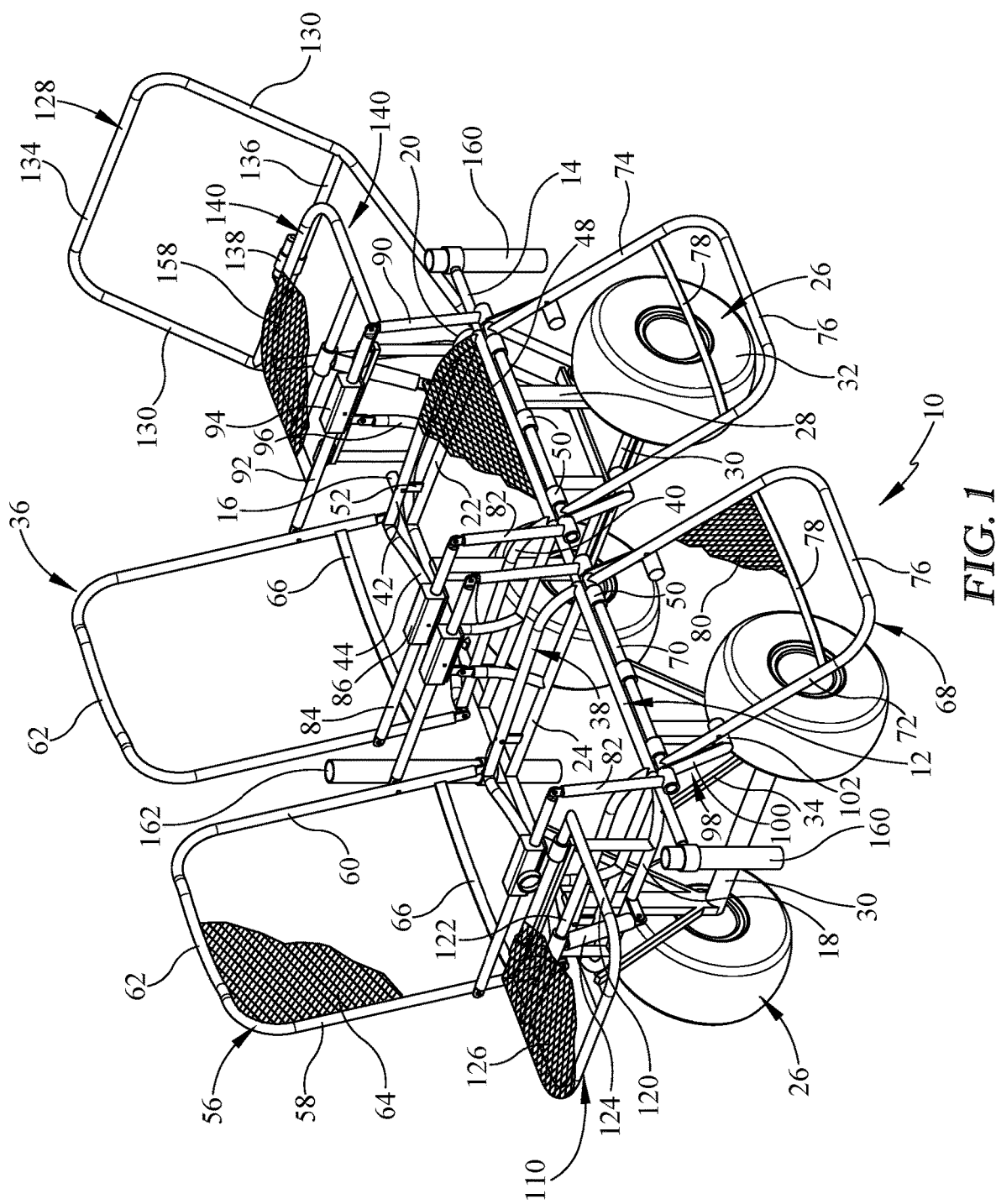
FIG. 1 is a left side perspective view of the transport cart with reclining chairs of the present invention in an unfolded state, ready for use as an enjoyment platform.
Figure 2:
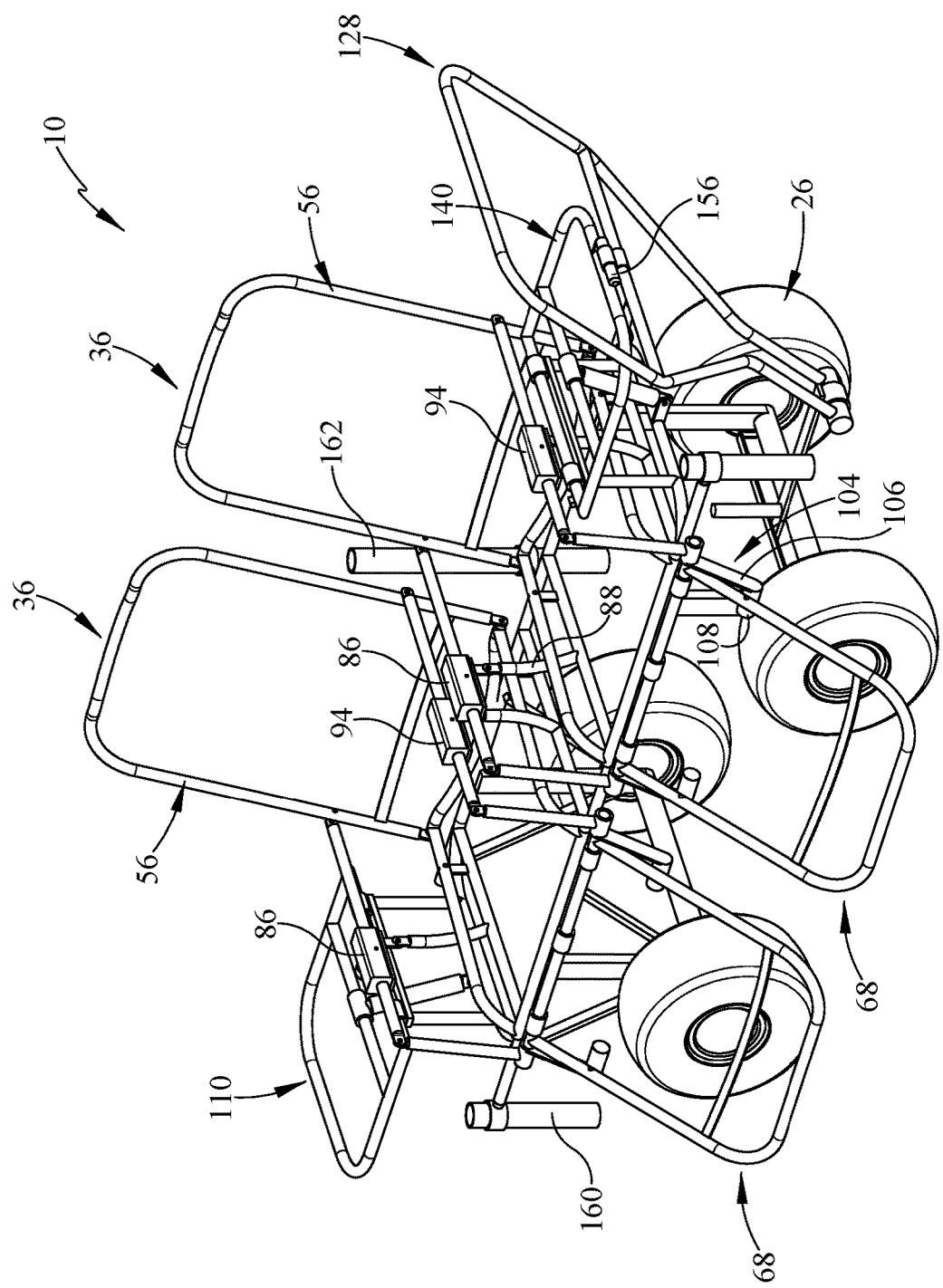
FIG. 2 is a right side perspective view of the transport cart with reclining chairs.
Figure 3:
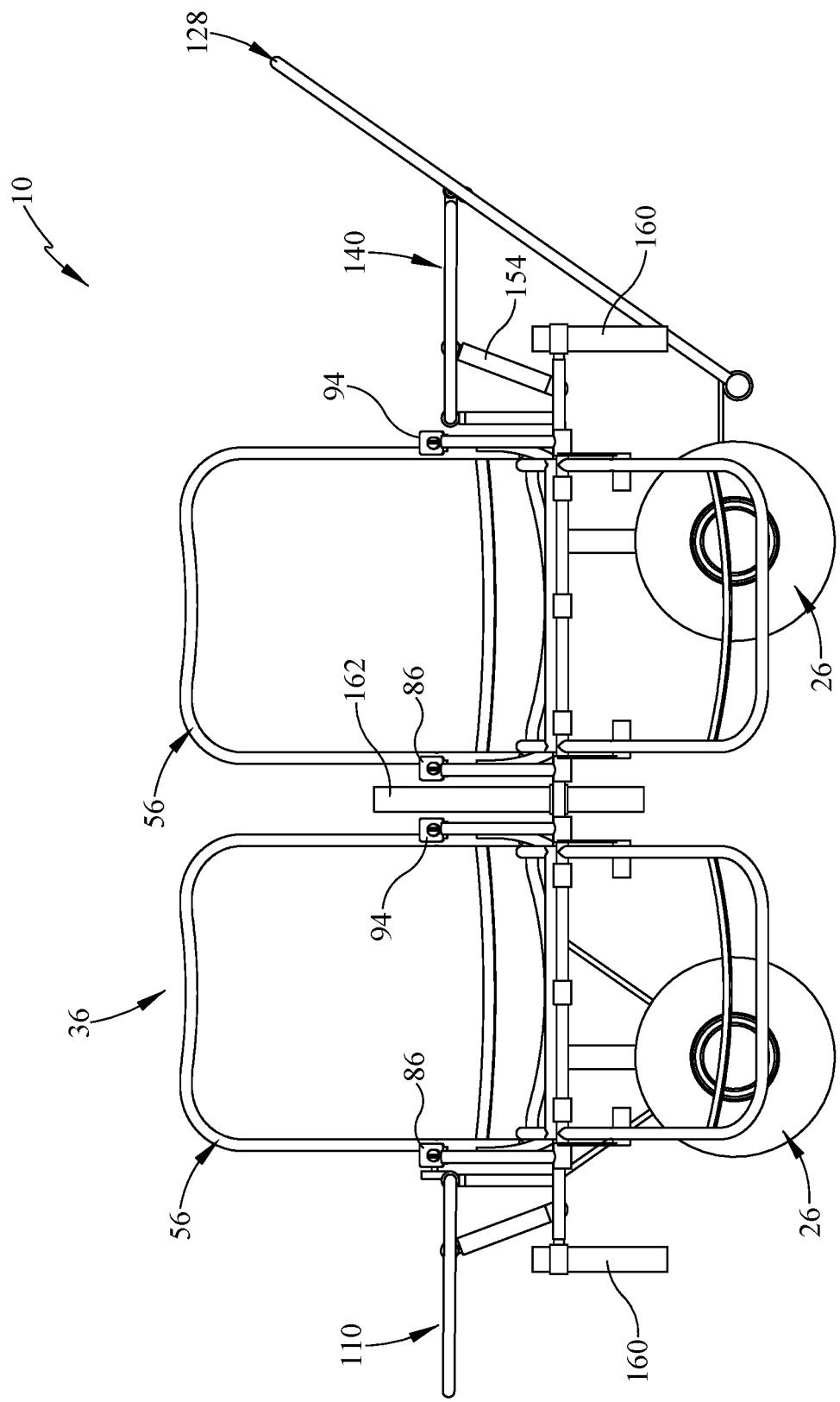
FIG. 3 is a front view of the transport cart with reclining chairs.
Figure 4:
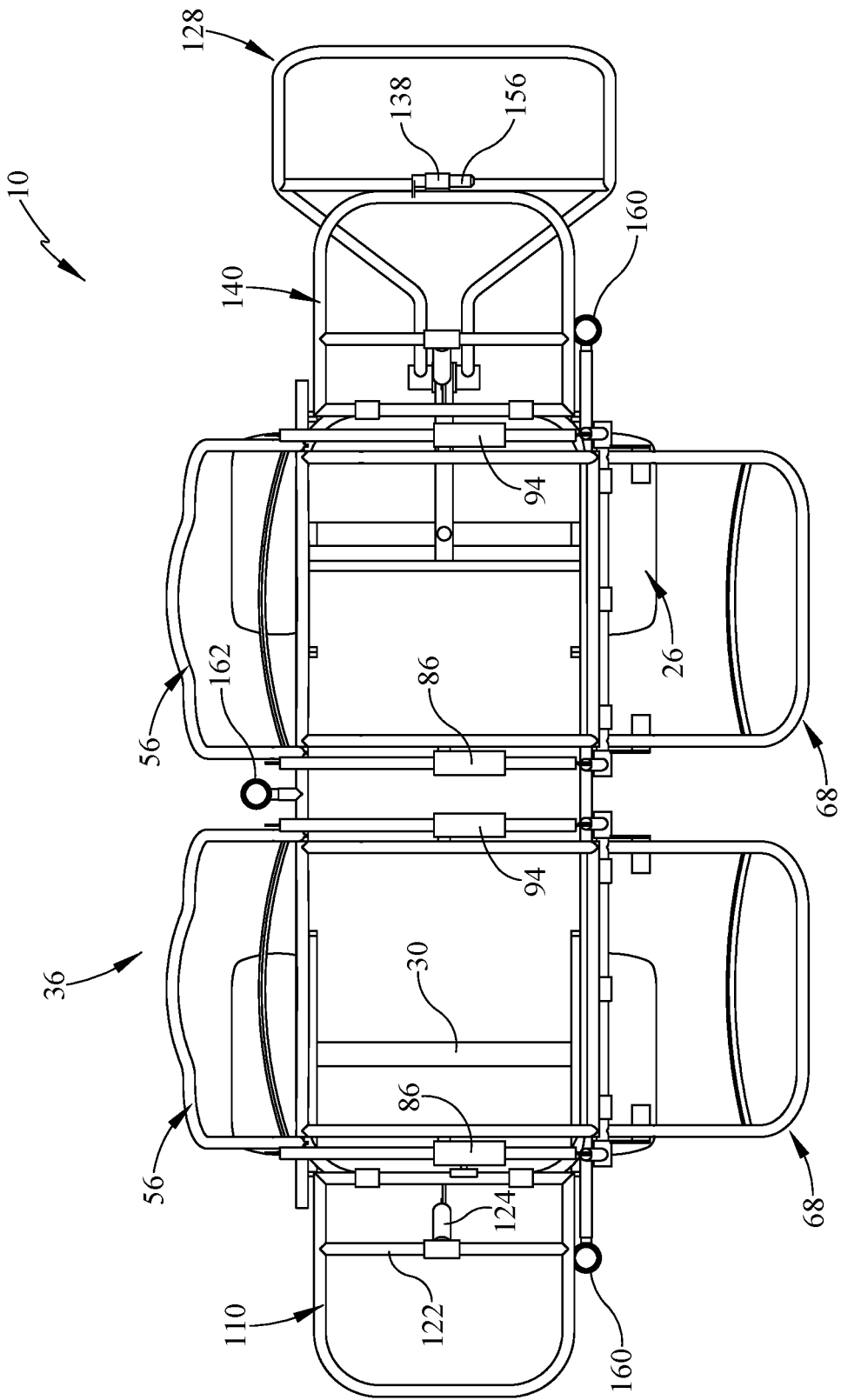
FIG. 4 is a top view of the transport cart with reclining chairs.
Figure 5:
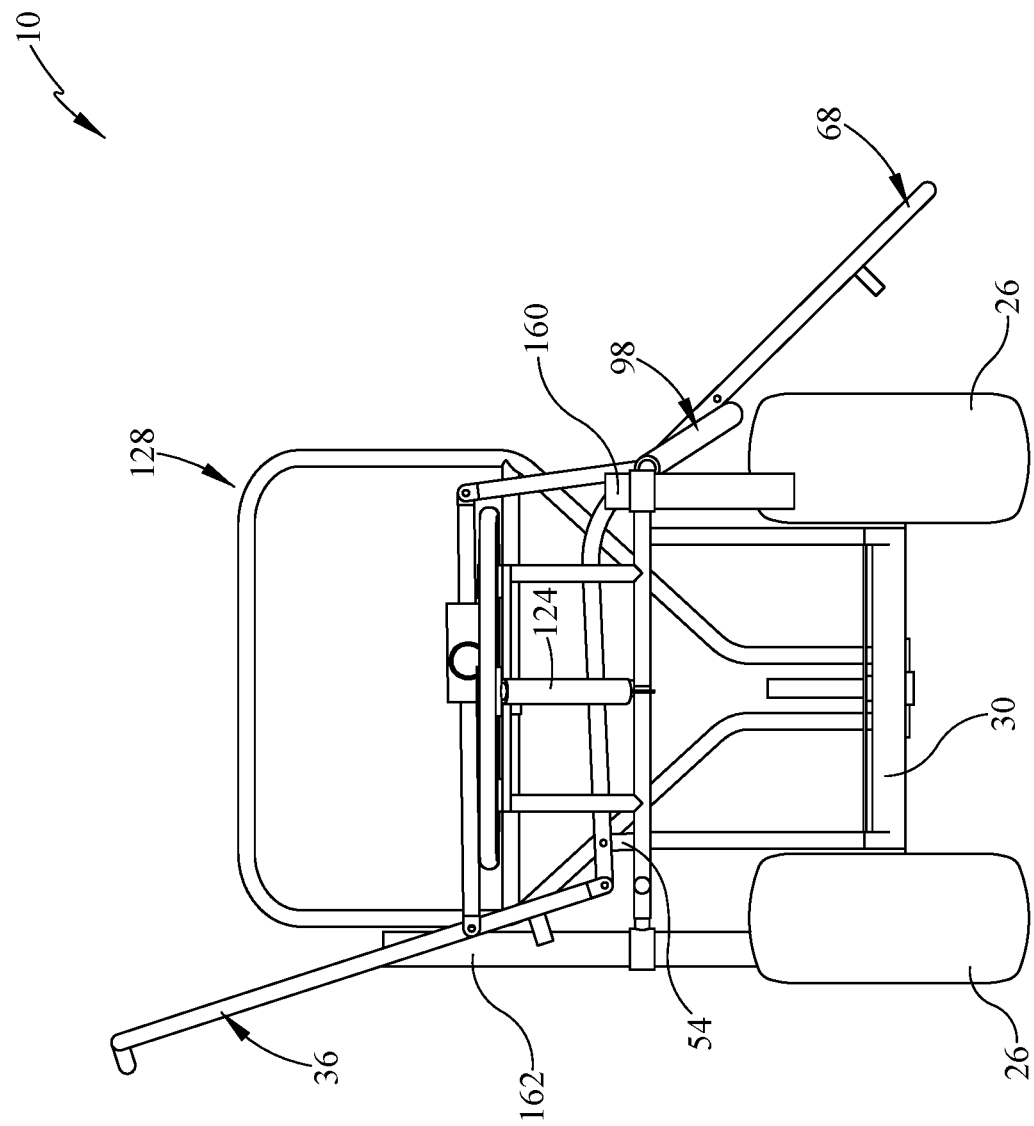
FIG. 5 is an end view of the transport cart with reclining chairs.

Referring now to the drawings, it is seen that the transport cart with reclining chairs of the present invention, generally denoted by reference numeral 10, is comprised of a frame 12 that has an front main leg 14 and a parallel rear main leg 16 connected by a left end leg 18 and a right end leg 20, forming a generally rectangular shaped frame 12, with both the from main leg 14 and the rear main leg 16 each extending past both the left end leg 18 and the right end leg 20. As seen, a pair of outside cross arms 22 connects the front main leg 14 and the rear main leg 16 and each is located proximate one of the end legs 16 or 18. As also seen, a pair of inside cross arms 24 connects the front main leg 14 and the rear main leg 16 and each is located proximate the radial midline of the frame 12. The outside cross arms 22 and the inside cross arms 24 are all generally parallel with one another. The various components of the frame 12 are made from an appropriate and sturdy material, such as aluminum, and are attached to each other as appropriate in any appropriate fashion, such as via welding, bolts, nuts and screws, the use of tubular receivers, etc., the components themselves being tubular members, bent as needed.

As seen a pair of wheel trucks 26 is attached to the underside of the frame 12 in spaced apart fashion. The wheel trucks 26, which can be of any appropriate design, each have a pair of main stanchions 28, with one stanchion attached to the front main leg 14 and the other stanchion 28 attached to the rear main leg 16. Extending between the bottom of the stanchions 28 is an axle housing 30 with a wheel axle (not illustrated) passing therethrough such that a pair of wheels 32 is located on either end of the axle, one wheel 32 per side. The wheels 32 are chosen for the anticipated terrain upon which the transport cart with reclining chairs 10 is designed to operate. For example, if the transport cart with reclining chairs 10 is intended to function as an actual beach cart, then the wheels 32 that transverse soft sand are selected, and if the transport cart with reclining chairs 10 is designed to operate in parks or in hilly or rocky areas, then off road type of wheels 32 are selected. Of course the wheels 32 can be interchangeable. As the transport cart with reclining chairs 10 is intended to carry loads of several hundred pounds, each stanchion 28 of one or both of the wheel trucks 26 can be flanked by a pair of braces 34 that have one end attached to the lower part of the stanchion 28 and the opposing end attached to either the front main leg 14 or the rear main leg 16 as appropriate. The components of the wheel trucks 26, other than the wheels 32 proper, can be made from the same or similar material used to make the frame 12.

As seen, a pair of reclining chairs 36 is attached to the frame 12 in side-by-side fashion. The left chair 36 is comprised of a base 38 that has a left base strut 40 and a right base strut 42 joined by a cross base strut 44, which may be curved downwardly if desired with the opposing ends of the left base strut 40 and the right base strut 42 connected to the front main leg 14. A base cover 48 is connected to each of the struts of the base 38 and the front main leg 14 and can be a cloth or mesh material, or as seen, a rigid material such as aluminum. A series of tubular receivers 50 is attached to the front main leg 14. A first post 52 extends upwardly from the outside cross arm 22 while a second post 54 extends upwardly the inside cross arm 24 that is nearer to the outside cross arm 22 for that chair 36, each post 52 and 54 located proximate the rear main leg 16. The left base strut 40 is pivotally attached to the first post 52 while the right base strut 42 is pivotally attached to the second post 54.

A chair back 56 is pivotally attached to the base 38 and is formed of a left back strut 58 that is pivotally attached to the left base strut 40 and a right back strut 60 that is pivotally attached to the right base strut 42. A cross back strut 62 connects the opposing ends of the left back strut 58 and the right back strut 60. A back cover 64 is connected to each of the struts of the chair back 56 and can be made from the same or similar material used to form the base cover 48. A back support strut 66 is attached to the left back strut 58 and to the right back strut 60 between the base 38 and the cross back strut 62. The back cover 64 may but need not necessarily be attached to the back support strut 66.

A leg rest 68 is pivotally attached to base 38 and is comprised of an upper leg strut 70 that is received within the tubular receivers 50 so as to be able to rotate or pivot with respect to the tubular receivers 50. A left leg strut 72 extends from the upper leg strut 70 while a right leg strut 74 extends from the upper leg strut 70 on a side of the upper leg strut 70 that is opposite whereat the left leg strut 72 is attached, such that a lower leg strut 76 connects the distal ends of the left leg strut 72 and the right leg strut 74. A leg support strut 78 extends between the left leg strut 72 and the right leg strut 74 between the upper leg strut 70 and the lower leg strut 76. A leg support cover 80 is connected to the upper leg strut 70, the left leg strut 72, the right leg strut 74 and the leg support strut 78 and can be made from the same or similar material used to form the base cover 48 and back cover 64.

A left arm support post 82 is pivotally attached to the upper leg strut 70 of the leg rest 68. A left horizontal support strut 84 has one end pivotally attached to the top of the left arm support post 82 and an opposing end attached to the left back strut 58 of the chair back 56. A left arm rest 86 is located medially along the left horizontal support strut 84. A left medial support post 88 has one end fixedly attached to the left base strut 40 of the base 38 and an opposing end pivotally attached to the left arm rest 86 and/or to the left horizontal support strut 84. Similarly, a right arm support post 90 is pivotally attached to the upper leg strut 70 of the leg rest 68, on an end oppose the attachment end of the left arm support post 82. A right horizontal support strut 92 has one end pivotally attached to the top of the right arm support post 90 and an opposing end attached to the right arm strut 60 of the chair back 56. A right arm rest 94 is located medially along the right horizontal support strut 92. A right medial support post 96 has one end fixedly attached to the right base strut 42 of the base 38 and an opposing end pivotally attached to the right arm rest 94 and/or to the right horizontal support strut 92.

A left leg rest support 98 is fixedly attached to the upper leg strut 70 proximate the left leg strut 72 and is comprised of a left rest post 100 having a transverse left stop 102 while a similar right leg rest support 104 is fixedly attached to the upper leg strut 70 proximate the right leg strut 74 and is comprised of a right rest post 106 having a transverse right stop 108.

The various frame components of each chair 36 are made from the same or similar material used to form the frame 12.

Figure 7:
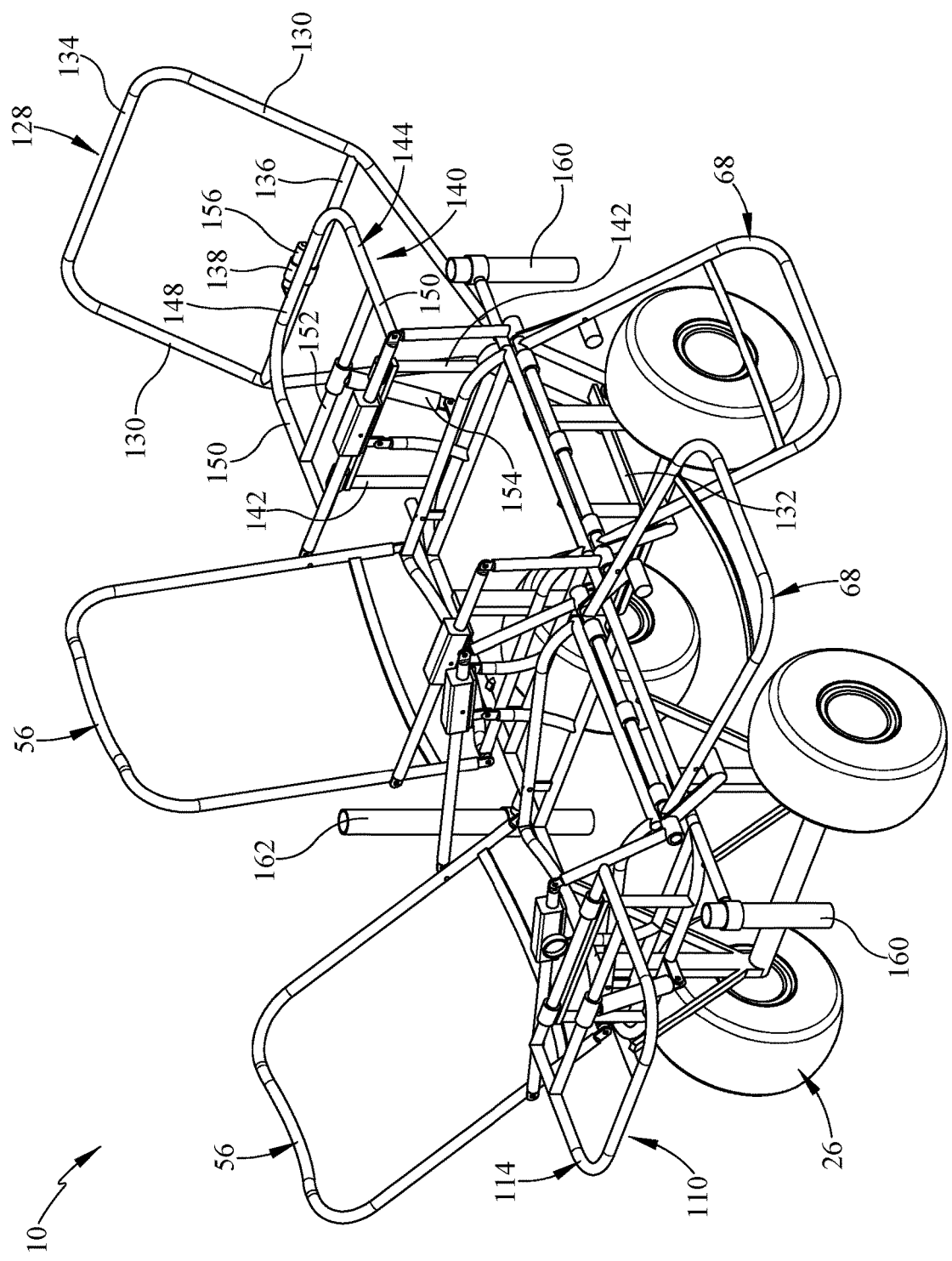
FIG. 7 is a perspective view of the transport cart with reclining chairs with one of the chairs in a reclined position.

As best seen in FIG. 7, the various pivotal attachments of many of the components of the chair 36 allow the chair back 56 to recline backwardly, which simultaneously raises the forward end of the base 38 its attached leg rest 68 to pivot upwardly at the base's forward end. The leg rest is also capable of rotating or pivoting independently with respect to the base 38 with the two leg rest supports 98 and 104 limiting the downward rotation of the leg rest 68, allowing a user to comfortably place his or her legs on the leg rest 68.

The right chair 36 is substantially similar to the left chair 38 so that its construction is not further described.

Appropriate covers (none illustrated), such as towels, pads, etc., can be placed on one or both of the chairs as desired. Of course the transport cart with reclining chairs 10 can be designed with a single chair 36.

Of course the chairs can have reclining mechanisms other than that described herein, as is well known in the art of reclining lawn chair, and further the chairs can be formed as fixed without reclining capabilities and the leg rest may also be in a single fixed position.

Figure 6:
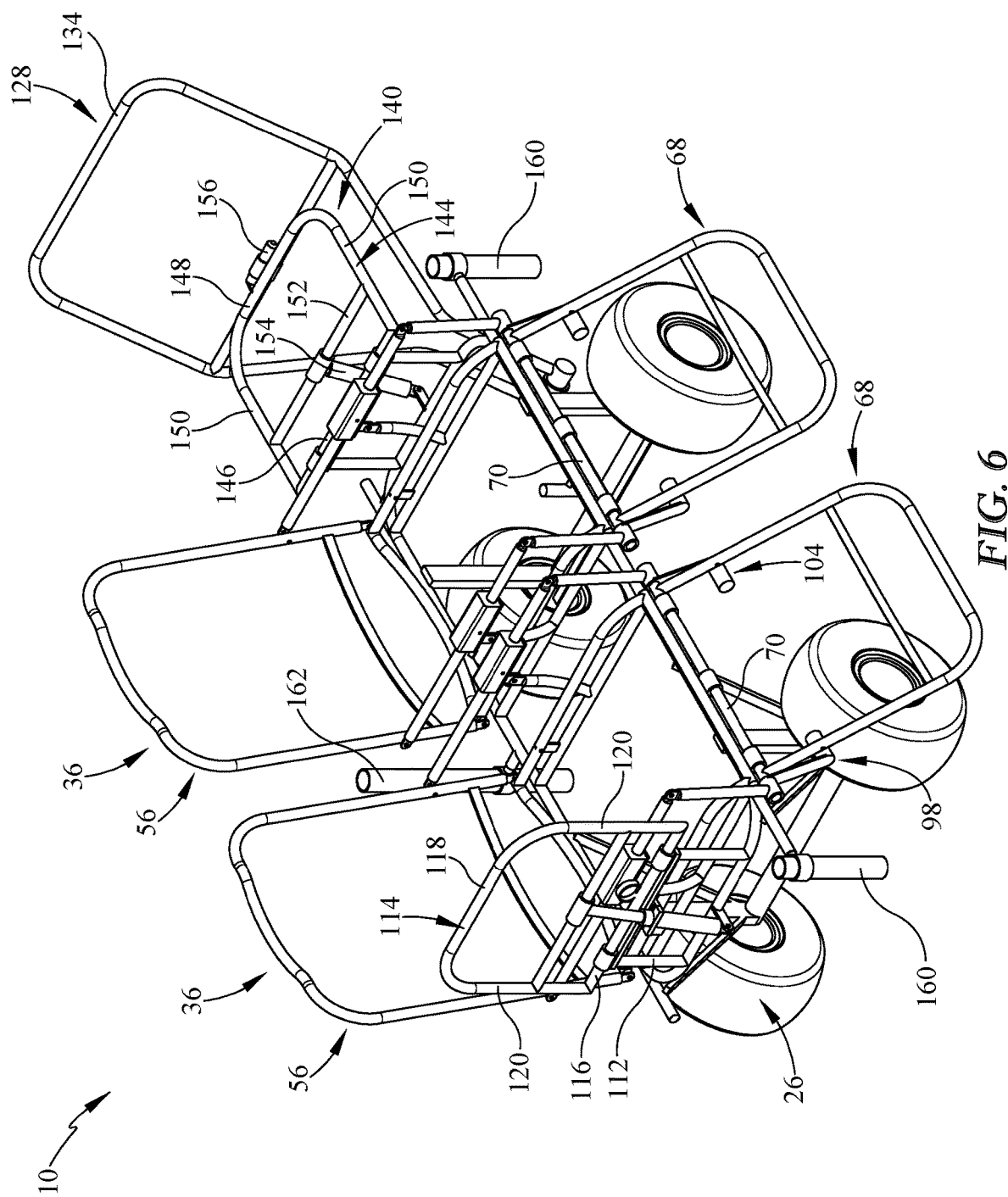
FIG. 6 is a perspective view of the transport cart with reclining chairs, in a partially folded state.
Figure 8:
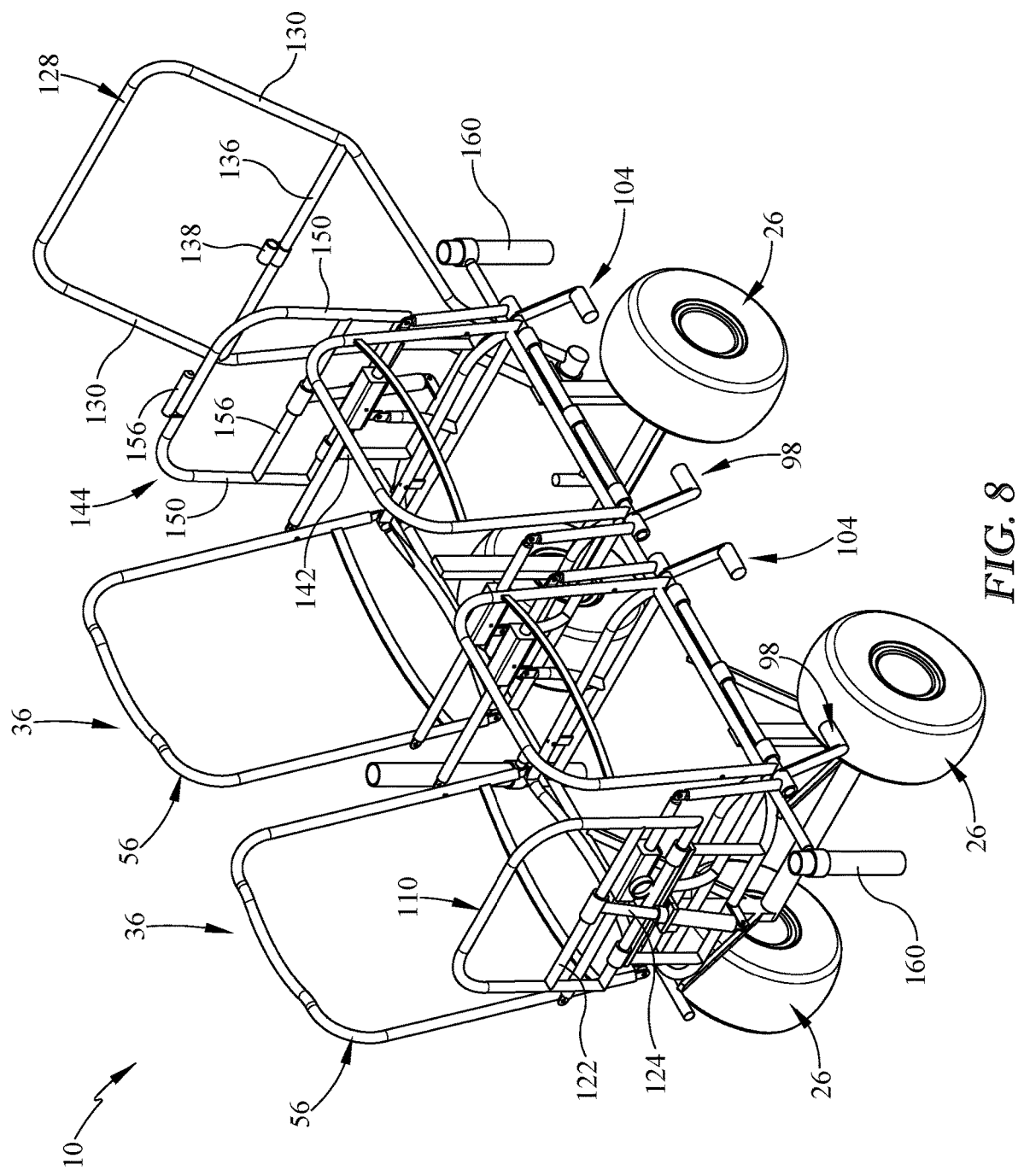
FIG. 8 is a perspective view of the transport cart with reclining chairs in a folded position.

A left table 110 is attached to the transport cart with reclining chairs 10 and is comprised of a pair of left table posts 112 that are attached to the left end leg 18 and extend upwardly therefrom. A left table frame 114 has a left inside leg 116 that is pivotally attached to each of the left table posts 112. A left outside leg 118 is connected to the left inside leg 116 via a pair of left side legs 120. A left table cross leg 122 extends between the pair of left side legs 120, between the left inside leg 116 and the left outside leg 118. A left table brace 124 has one end pivotally attached to the left table cross leg 122 and an opposing end pivotally attached to the left end leg 18. As seen, the left table 110 is capable of rotating between a folded, upwardly oriented vertical position, as seen in FIGS. 6 and 8, and an extended horizontal position. The left table brace 124 not only acts to brace the left table 110 to receive relatively heavy loads thereon, but is also dimensioned to act as a stop whenever the left table 110 is unfolded from its vertical position to the horizontal position for use. An appropriate left table top 126 is attached to the left table frame 114 and the left table cross leg 122 and can be a relatively solid material, or as seen, a mesh material, made from metal, cloth, etc.

A handle 128 is attached to the transport cart with reclining chairs 10 via a pair of elongate legs 130 that are each attached to the axle housing 30 of the closer wheel truck 26 via a handle strut 132 (although they can also be attached to the frame 12). The elongate legs 130 are joined at their distal ends by a handle leg 134 that may have a comfort grip material (not illustrated) encircling it. A handle cross leg 136 also extends between the pair of elongate legs 130 below the handle leg 134. A receiver 138 is located on the handle cross leg 136. The various frame components of the handle 128 are made from the same or similar material used to form the frame 12.

A right table 140 is attached to the transport cart with reclining chairs 10 and is comprised of a pair of right table posts 142 that are attached to the right end leg 20 and extend upwardly therefrom. A right table frame 144 has a right inside leg 146 that is pivotally attached to each of the right table posts 142. A right outside leg 148 is connected to the right inside leg 146 via a pair of right side legs 150. A right table cross leg 152 extends between the pair of right side legs 150, between the right inside leg 146 and the right outside leg 148. A right table brace 154 has one end pivotally attached to the right table cross leg 152 and an opposing end pivotally attached to the right end leg 20. As seen, the right table 140 is capable of rotating between a folded, upwardly oriented vertical position, as seen in FIG. 8, and an extended horizontal position. The right table brace 154 not only acts to brace the right table 140 to receive relatively heavy loads thereon, but is also dimensioned to act as a stop whenever the right table 140 is unfolded from its vertical position to the horizontal position for use. As seen, a pin 156 is slidably disposed on the right outside leg 148 so that when the right table 140 is in its unfolded horizontal position, the pin 156 is aligned with the receiver 138 located on the handle and is slid thereinto in order to provide additional load support for the right table 140. An appropriate right table top 158 is attached to the right table frame 144 and the right table cross leg 152 and can be a relatively solid material, or as seen, a mesh material, made from metal, cloth, etc.

The various frame components of the left table 110 and the right table 140 are made from the same or similar material used to form the frame 12.

A pair of first holders 160 is attached to either end of the front main leg 14 and can be configured to receive a fishing pole or beverage receptacles, etc. A second holder 162 is attached to the rear main leg 16 between the two chairs 36 for receiving and holding an umbrella.

In order to use the transport cart with reclining chairs 10 of the present invention, the cart is placed into a folded configuration, as best seen in FIG. 8, wherein the left table 110 and the right table 140 are each folded upwardly into their folded vertical position. The leg rest 68 of each chair is 36 is rotated upwardly and the chair back 56 of each chair 36 is placed into an generally upright unreclined position. The cart is loaded as desired by placing various objects onto each chair 36, being held in place via the upright chair backs 56 and leg rests 68 and the left table 110 and the right table 140. If desired, a fishing pole can be placed into the first holders 160 and an umbrella into the second holder 162, or these items can be placed onto the main part of the cart. The cart is pulled along by the handle 128. Once at the desired location, the cart is unloaded. If a person desires to use a chair 36, the leg rest 68 for the chair 36 is rotated into an appropriate position and the chair 36 used as desired. The table 110 or 140 associated with that chair 36 can also be unfolded as desired. Each chair 36 can be deployed in this fashion. If not already in place, the umbrella is place into the second holder 162 to provide shade for the users and fishing poles or drink receptacles as appropriate can be placed into the first holders 160 as desired. At the end of the day, the process is reversed.

While the invention has been particularly shown and described with reference to an embodiment thereof, it will be appreciated by those skilled in the art that various changes in form and detail may be made without departing from the spirit and scope of the invention.

We claim:
1. A cart comprising:
a generally rectangular-shaped and planar frame having a first side defined by a tubular first leg and an opposing second side defined by a tubular second leg joined by a first end defined by a tubular third leg that connects the first leg and the second leg at the first end and an opposing second end defined by a tubular fourth leg that connects the first leg and the second leg at the second end;
a first wheel set extending downwardly from a lower surface of the frame, the first wheel set located proximate the first end, the first wheel set defined by a first axle housing a having a first axle passing therethrough such that a first wheel is located on each end of the first axle and such that a first strut attaches the first axle housing to the first leg and a second strut attaches the first axle housing to the second leg;
a second wheel set extending downwardly from the lower surface of the frame, the first wheel located proximate the second end, the second wheel set defined by a second axle housing a having a second axle passing therethrough such that a second wheel is located on each end of the second axle and such that a third strut attaches the second axle housing to the first leg and a fourth strut attaches the second axle housing to the second leg;
a handle attached to either the first wheel set or to the frame;
a chair attached the frame and extending upwardly from an upper surface of the frame, wherein the chair has a leg rest extending from the base proximate the first side of the frame; and a table attached to the frame and located proximate the chair.

2. The cart as in claim 1 wherein the chair has a base that extends between the first side and the second side, and a chair back attached to the base proximate the second side of the frame, the chair back articulating between an upright position and a reclined position.

3. The cart as in claim 1 wherein the leg rest is rotatably attached to the frame.

4. The cart as in claim 1 wherein the table articulates between a horizontal position parallel with the frame and a vertical position.

5. The cart as in claim 1 wherein the table articulates between a horizontal position parallel with the frame and an upwardly oriented vertical position.

6. The cart as in claim 1 wherein the table articulates between a horizontal position parallel with the frame and a vertical position such that when the table is in the horizontal position, the table attaches to the handle.

7. The cart as in claim 1 further comprising a first holder having a first open top, the first holder attached to the first side of the frame proximate the chair.

8. The cart as in claim 7 further comprising a second holder having a second open top, the second holder attached to the second side of the frame proximate the chair.

9. A cart comprising:
a generally rectangular-shaped and planar frame having a first side defined by a tubular first leg and an opposing second side defined by a tubular second leg joined by a first end defined by a tubular third leg that connects the first leg and the second leg at the first end and an opposing second end defined by a tubular fourth leg that connects the first leg and the second leg at the second end;
a first wheel set extending downwardly from a lower surface of the frame, the first wheel set located proximate the first end, the first wheel set defined by a first axle housing a having a first axle passing therethrough such that a first wheel is located on each end of the first axle and such that a first strut attaches the first axle housing to the first leg and a second strut attaches the first axle housing to the second leg;
a second wheel set extending downwardly from the lower surface of the frame, the first wheel located proximate the second end, the second wheel set defined by a second axle housing a having a second axle passing therethrough such that a second wheel is located on each end of the second axle and such that a third strut attaches the second axle housing to the first leg and a fourth strut attaches the second axle housing to the second leg;
a handle attached to either the first wheel set or to the frame;
a first chair attached the frame and extending upwardly from an upper surface of the frame and located proximate the first end;
a second chair attached the frame and extending upwardly from the upper surface of the frame and located proximate the second end;
a first table attached to the frame and located proximate the first end; and
a second table attached to the frame located proximate the second end; and wherein the first chair has a first base that extends between the first side and the second side, and a first chair back attached to the first base proximate the second side of the frame, the first chair back articulating between a first upright position and a first reclined position and wherein the second chair has a second base that extends between the first side and the second side, and a second chair back attached to the second base proximate the second side of the frame, the second chair back articulating between a second upright position and a second reclined position.

10. The cart as in claim 9 wherein the first chair has a first leg rest extending from the first base proximate the first side of the frame and the second chair has a second leg rest extending from the second base proximate the first side of the frame.

11. The cart as in claim 10 wherein the first leg rest and the second leg rest are each rotatably attached to the frame.

12. The cart as in claim 9 wherein the first table articulates between a first horizontal position parallel with the frame and a first vertical position and the second table articulates between a second horizontal position parallel with the frame and a second vertical position.

13. The cart as in claim 9 wherein the first table articulates between a first horizontal position parallel with the frame and an upwardly oriented first vertical position and second table articulates between a second horizontal position parallel with the frame and an upwardly oriented second vertical position.

14. The cart as in claim 9 wherein the first table articulates between a first horizontal position parallel with the frame and a first vertical position such that when the first table is in the first horizontal position, the first table attaches to the handle and wherein the second table articulates between a second horizontal position parallel with the frame and a second vertical position.

15. The cart as in claim 9 further comprising:
a first holder having a first open top, the first holder attached to the first side of the frame proximate the first chair; and
a second holder having a second open top, the second holder attached to the first side of the frame proximate the second chair.

16. The cart as in claim 15 further comprising a third holder having a third open top, the third holder attached to the second side of the frame between the first chair and the second chair.

17. A cart comprising:
a generally rectangular-shaped and planar frame having a first side defined by a tubular first leg and an opposing second side defined by a tubular second leg joined by a first end defined by a tubular third leg that connects the first leg and the second leg at the first end and an opposing second end defined by a tubular fourth leg that connects the first leg and the second leg at the second end;
a first wheel set extending downwardly from a lower surface of the frame, the first wheel set located proximate the first end, the first wheel set defined by a first axle housing a having a first axle passing therethrough such that a first wheel is located on each end of the first axle and such that a first strut attaches the first axle housing to the first leg and a second strut attaches the first axle housing to the second leg;
a second wheel set extending downwardly from the lower surface of the frame, the first wheel located proximate the second end, the second wheel set defined by a second axle housing a having a second axle passing therethrough such that a second wheel is located on each end of the second axle and such that a third strut attaches the second axle housing to the first leg and a fourth strut attaches the second axle housing to the second leg;

a handle attached to either the first wheel set or to the frame;

a chair attached the frame and extending upwardly from an upper surface of the frame; and a table attached to the frame and located proximate the chair wherein the table articulates between a horizontal position parallel with the frame and a vertical position such that when the table is in the horizontal position, the table attaches to the handle.

18. The cart as in claim 17 wherein the chair has a base that extends between the first side and the second side, and a chair back attached to the base proximate the second side of the frame, the chair back articulating between an upright position and a reclined position.

19. The cart as in claim 17 further comprising a first holder having a first open top, the first holder attached to the first side of the frame proximate the chair.

20. The cart as in claim 19 further comprising a second holder having a second open top, the second holder attached to the second side of the frame proximate the chair.

21. A cart comprising:

a generally rectangular-shaped and planar frame having a first side defined by a tubular first leg and an opposing second side defined by a tubular second leg joined by a first end defined by a tubular third leg that connects the first leg and the second leg at the first end and an opposing second end defined by a tubular fourth leg that connects the first leg and the second leg at the second end;

a first wheel set extending downwardly from a lower surface of the frame, the first wheel set located proximate the first end, the first wheel set defined by a first axle housing a having a first axle passing therethrough such that a first wheel is located on each end of the first axle and such that a first strut attaches the first axle housing to the first leg and a second strut attaches the first axle housing to the second leg;

a second wheel set extending downwardly from the lower surface of the frame, the first wheel located proximate the second end, the second wheel set defined by a second axle housing a having a second axle passing therethrough such that a second wheel is located on each end of the second axle and such that a third strut attaches the second axle housing to the first leg and a fourth strut attaches the second axle housing to the second leg;

a handle attached to either the first wheel set or to the frame;

a chair attached the frame and extending upwardly from an upper surface of the frame;

a table attached to the frame and located proximate the chair; and a first holder having a first open top, the first holder attached to the first side of the frame proximate the chair.

22. The cart as in claim 1 wherein the chair has a base that extends between the first side and the second side, and a chair back attached to the base proximate the second side of the frame, the chair back articulating between an upright position and a reclined position.

23. The cart as in claim 21 further comprising a second holder having a second open top, the second holder attached to the second side of the frame proximate the chair.

* * * * *